Figure 3:
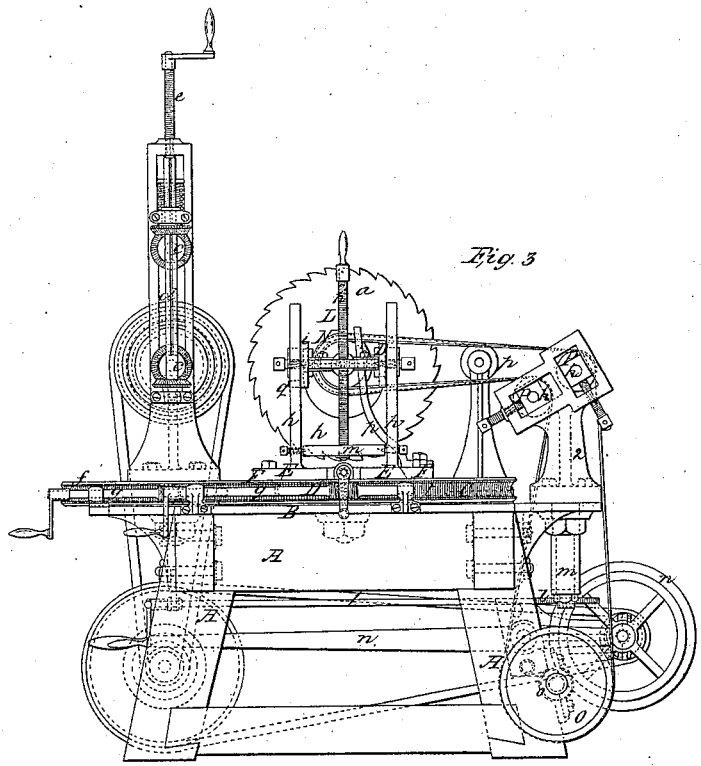

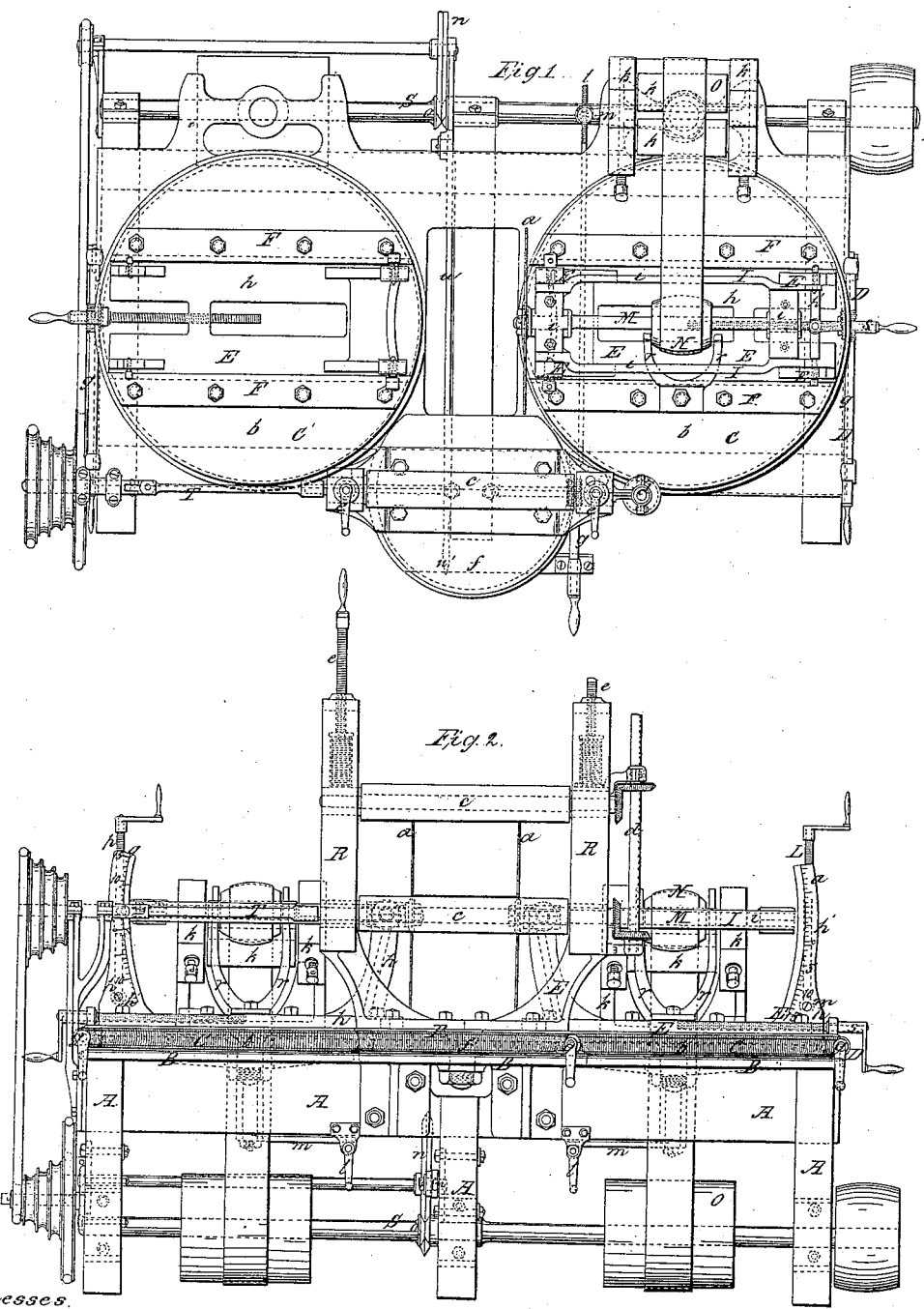

2 Sheets, Sheet 2.

L. Vance,
Circular Saw Mill.

Nº 41,877.          Patented Mar. 8, 1864.

Witnesses
Henry A. Wind
Chancey A. Hoor

Inventor
Lorenzo Vance

UNITED STATES PATENT OFFICE.

LORENZO VANCE, OF PHILADELPHIA, PENNSYLVANIA.

IMPROVEMENT IN SAW-MILLS.

Specification forming part of Letters Patent No. 41,877, dated March 8, 1864.

*To all whom it may concern:*

Be it known that I, LORENZO VANCE, of the county of Philadelphia and State of Pennsylvania, have invented a new and useful machine for sawing at the same time the two opposite sides of a stick of timber to any given curves and to any required vertical angles, for ship-building purposes or any other purposes requiring irregular-shaped timber; and I do hereby declare that the following is a full and exact description thereof, reference being had to the accompanying drawings, and to the letters of reference marked thereon.

The nature of my invention consists in hanging two circular saws facing each other on separate frames resting on the same bed-plate in such a way that, while running, each may be rotated on a vertical axis through an arc of twenty degrees; be made to approach each other or recede from each other, and also be rotated on a horizontal axis through an arc of thirty degrees, and thus within certain limits permitting the two saws to be set each at any vertical angle; to be set at any distance apart and at any horizontal angle with reference to each other, or with reference to a given line or vertical plane, and in applying to the machine an adjustable feeding apparatus to enable the operator to change at will the direction of the stick of timber being sawed, thus enabling the operator to make each saw follow a distinct curve and cut at any given vertical angle within the limits above mentioned. For the want of such a machine ship-building has been lagging behind almost all other branches of industry.

To enable others skilled in the art to make and use my invention, I will proceed to describe its construction and operation.

Figure 1 is a plan of the machine. Fig. 2 is a front elevation, and Fig. 3 an end elevation, of the machine.

The same parts of the machine are indicated in the several figures by the same letters.

A A A, Figs. 2 and 3, is a substantial frame on the top of which is bolted firmly a metallic bed-plate, B B B, Figs. 2 and 3. On this plate B B B are placed two disks, C and C', Figs. 1, 2. These disks are duplicates of each other, and also the attachments to the one of them are duplicates of the attachments to the other; consequently only one, with its attachments, will be described. The disk C rotates on a vertical axis which has its bearings in the bed-plate B. The edge of this disk is made concave, and has a screw-thread cut in it, as seen in Figs. 2 and 3. In this thread works an endless screw, D, by which the disk is held in place and rotated at will to the right or to the left. On this disk, and directly over its axis or center, is placed a sliding frame, E, having head-blocks at each end. This frame E is held in place by two beveled cleats, F F, placed at equal distances from and parallel to a line drawn through the center of the disk C. A screw, $s$, is used to move this frame backward or forward at will. The head-block at one end of this frame has on it a scale marked in degrees, as represented in Fig. 2. In this sliding frame E is placed the saw-frame I, pivoted as near to the saw $a$ as possible, and the other end guided between the head-blocks of the sliding frame E. The graduated scale mentioned above shows to what angle above or below the horizontal the saw-frame I has been raised or lowered. The saw-frame $i$ is so hung in the sliding frame E that the axis of the disk C extended would pass through the axis of the saw-mandrel M. This saw-frame I is vibrated up or down by the screw L, the lower end of which turns in a cross-bar attached to the head-blocks on that end of the sliding frame E, and operates in a female screw attached to the saw-frame I. This female screw and cross-bar have a slight rotating motion by which they adapt themselves to the screw L as the saw-frame I is vibrated up or down.

On the saw-mandrel M is placed a sliding pulley, N, made to slide in order that its position may always be such that the axis of the disk C extended may pass through its center. This pulley N is held in its place by the guide $r$, which also serves to keep the band on the pulley.

The saw-frame I may be pivoted in the plane of the face of the saw instead of being pivoted very near to it as represented.

From this construction it will be seen that the saw can be moved in three different ways, changing the plane of its face to any angle, within certain limits, either vertical or horizontal, and the motion given to it by the sliding frame E, a motion toward or from the axis extended of the disk C, or, when two saws are placed as represented in Figs. 1 and 2, a motion toward or from each other.

Power is communicated to the saw from the driving-pulley O by an endless belt passing over the adjustable carrying-pulleys P P, set in a frame, Q, turning slightly on a vertical axis to counteract the tendency of the band to run off from the pulley N as the disk C is turned to the right or to the left. This frame Q is rotated by means of a crank placed on the lower end of the shaft extending down below the bed-plate B, having in the end of the crank a female screw in which operates the screw $l$. The carrying-pulleys P P are also made adjustable with set-screws for the purpose of tightening the band when required.

It will be seen from the above that in moving the position of the saw in any of the ways mentioned the tension of the band will be but slightly varied on account of the pulley N being in the center of motion of the disk C, and its not being affected at all by the motion of the sliding frame E, and the change of tension by the motion of the saw-frame I can be only slight.

In front of the two disks C and C', and at equal distances from them, is placed a frame, R, having a slight rotating motion on a vertical axis. This frame is furnished with two adjustable feed-rollers, $c\ c$, the lower one of which is geared to the perpendicular shaft $d$, on which is a sliding bevel-gear meshing into another one attached to the upper feed-roller. These two last-mentioned gears rise and fall together, the one being attached to the upper feed-roller and the other to the bearing of that roller, and is turned by a pin working in the grooved shafts $d$. The upper feed-roller is raised and lowered by the screws $e\ e$, working in nuts in the feed-frame R, and their lower ends being attached to the bearings of this roller by short coil-springs, allowing the roller to adjust itself to the unequal thickness of the timber to be sawed. This feed-frame R is rotated in the same way and by means precisely similar to those used in rotating the disk C. Power is communicated to these rollers $c\ c$ from the driving-shaft S, by means of the V-shaped friction-wheel $n$, on the shaft of which is a pulley communicating motion with a band to a set of cone-pulleys. (Represented in Figs. 1 and 2.) From the shaft of the upper cone-pulley power is communicated to the lower feed-roller by a shaft, T, having two universal and extension joints, allowing the feed-frame R to rotate to a certain distance without affecting the motion of the feed-rollers. The connection between the V-shaped friction-roller $n$, Figs. 1 and 2, and the driving-shaft S is made and broken at will by means of the lever $n'$.

By turning the feed-frame R one way or the other the timber being sawed can be made to travel in any desired direction, so as to approach the saw in a direct or in an oblique line, as circumstances may require.

What I claim as my invention, and desire to secure by Letters Patent, is—

1. The combination and arrangement of the rotating disk C, sliding frame E, frame I, carrying the saw $a$, and the means of adjusting them severally or singly, when constructed and operating substantially as described.

2. The arrangement of the sliding frame E, the saw-frame I, and saw $a$, when constructed and used substantially as and for the purpose specified.

3. The adjustable pulley-frame Q and pulleys P P, in combination with the saw-frame I, and sliding frame E, and its adjusting devices, when arranged to operate as described.

4. The rotating frame R, having adjustable feed-rollers $c\ c$, with their adjusting and operating devices, in combination with a driving-shaft, T, having two universal joints, substantially as described.

LORENZO VANCE.

Witnesses:
HENRY A. WIND,
CHANCEY A. HORR.